(12) United States Patent
Studer et al.

(10) Patent No.: US 6,886,292 B2
(45) Date of Patent: May 3, 2005

(54) INSECT TRAP

(75) Inventors: Bruce Studer, Germantown, WI (US); Tim Jones, Phoenix, AZ (US)

(73) Assignee: Gardner Manufacturing Co., Inc., Horicon, WI (US)

( * ) Notice: Subject to any disclaimer, the term of this patent is extended or adjusted under 35 U.S.C. 154(b) by 0 days.

(21) Appl. No.: 10/392,349

(22) Filed: Mar. 19, 2003

(65) Prior Publication Data

US 2004/0200129 A1 Oct. 14, 2004

(51) Int. Cl.[7] .................. A01M 1/02; A01M 1/04; A01M 1/14; A01M 1/22
(52) U.S. Cl. .................. 43/113; 43/112; 43/114
(58) Field of Search .................. 43/112, 113, 114

(56) References Cited

U.S. PATENT DOCUMENTS

| | | | | |
|---|---|---|---|---|
| 944,882 | A | | 12/1909 | Laube et al. .................. 43/114 |
| 970,784 | A | | 9/1910 | Bohm .................. 43/113 |
| 1,009,580 | A | | 11/1911 | Robinson .................. 43/113 |
| 1,019,410 | A | | 3/1912 | Baker .................. 43/113 |
| 1,150,835 | A | * | 8/1915 | Satinover .................. 43/112 |
| 1,280,359 | A | | 10/1918 | Abresch .................. 43/113 |
| 1,304,397 | A | | 5/1919 | Snead .................. 43/113 |
| 1,820,813 | A | | 8/1931 | Loomis .................. 43/113 |
| 2,286,568 | A | | 6/1942 | Petry .................. 43/113 |
| 2,384,930 | A | | 9/1945 | Kendrick .................. 43/113 |
| 2,465,574 | A | * | 3/1949 | Brown et al. .................. 43/112 |
| 2,645,877 | A | | 7/1953 | Pohlman .................. 43/113 |
| 2,674,682 | A | * | 4/1954 | Hanson .................. 43/113 |
| 2,731,762 | A | | 1/1956 | Jones .................. 43/113 |
| 2,786,298 | A | | 3/1957 | Smith .................. 43/118 |
| 2,787,083 | A | | 4/1957 | Jones .................. 43/113 |
| 3,023,539 | A | * | 3/1962 | Emerson, Jr. .................. 43/113 |
| 3,059,373 | A | | 10/1962 | Gardner .................. 43/113 |
| 3,346,988 | A | | 10/1967 | Pickering .................. 43/112 |
| 3,348,332 | A | | 10/1967 | O'Connell et al. .................. 43/113 |
| 3,465,468 | A | | 9/1969 | Takamoto .................. 43/113 |
| 3,491,478 | A | | 1/1970 | Gilbert .................. 43/112 |
| 3,513,585 | A | | 5/1970 | Ross .................. 43/113 |

(Continued)

FOREIGN PATENT DOCUMENTS

| | | | |
|---|---|---|---|
| DE | 3810065 C1 | | 4/1989 |
| DE | 29816743 B1 | * | 1/1999 |
| JP | 2-174627 | | 7/1990 |
| JP | 3-250501 | | 11/1991 |
| JP | 8-33444 B1 | * | 2/1996 |
| JP | 10-99001 B1 | * | 4/1998 |
| JP | 2000-4756 B1 | * | 1/2000 |
| JP | 2000-60403 B1 | * | 2/2000 |
| JP | 2000-209998 B1 | * | 8/2000 |
| JP | 2000-324999 B1 | * | 11/2000 |
| JP | 2002-306044 B1 | * | 10/2002 |
| JP | 2003-9745 B1 | * | 1/2003 |
| JP | 2003-47383 B1 | * | 2/2003 |
| JP | 2003-168181 B1 | * | 6/2003 |
| JP | 2003-180221 B1 | * | 7/2003 |
| KR | 20003027929 B1 | * | 4/2003 |
| WO | PCT/GB92/00911 | | 11/1992 |
| WO | WO92/20224 | | 11/1992 |

*Primary Examiner*—Darren W. Ark
(74) *Attorney, Agent, or Firm*—Foley & Lardner LLP

(57) ABSTRACT

An insect trap which includes a base having a rear surface and a front surface, a housing mounted to cover at least a portion of the front surface of the base, an insect attractant such as a light located at least partially within the housing, an insect neutralizer such as an adhesive surface located at least partially within the housing, and an electrical plug protruding from the rear surface of the base whereby the insect trap may be mounted to an electrical socket by inserting the electrical plug into the electrical socket. The insect trap can be easily mounted and removed, making it suitable for intermittent, seasonal, or temporary use.

15 Claims, 6 Drawing Sheets

U.S. PATENT DOCUMENTS

| | | | |
|---|---|---|---|
| 3,685,198 A | 8/1972 | Smith | 43/112 |
| D225,631 S | 12/1972 | Gilbert | D22/123 |
| 3,768,196 A | 10/1973 | Iannini | 43/112 |
| 3,998,000 A | 12/1976 | Gilbert | 43/112 |
| 4,002,146 A | 1/1977 | Neff | 119/51.04 |
| 4,044,494 A | 8/1977 | Grajnert | 43/119 |
| 4,074,457 A | 2/1978 | Sato et al. | 43/113 |
| 4,117,624 A | 10/1978 | Phillips | 43/113 |
| 4,127,961 A | 12/1978 | Phillips | 43/113 |
| 4,141,173 A | 2/1979 | Weimert et al. | 43/113 |
| 4,144,668 A | 3/1979 | Darncharnjitt | 43/107 |
| 4,157,629 A | 6/1979 | Parks | 43/113 |
| D253,606 S | 12/1979 | Yavnieli | D22/123 |
| 4,186,512 A | 2/1980 | Berg | 43/112 |
| 4,212,129 A * | 7/1980 | Shumate | 43/113 |
| 4,332,100 A | 6/1982 | Schneider | 43/113 |
| 4,366,643 A | 1/1983 | Boaz | 43/113 |
| D269,632 S | 7/1983 | Robertston et al. | D22/123 |
| 4,411,093 A | 10/1983 | Stout et al. | 43/114 |
| 4,422,015 A | 12/1983 | Nilssen | 43/112 |
| 4,438,585 A * | 3/1984 | Slatton | 43/113 |
| 4,490,937 A | 1/1985 | Yavnieli | 43/112 |
| 4,654,998 A * | 4/1987 | Clay | 43/113 |
| 4,686,789 A | 8/1987 | Williams | 43/113 |
| 4,696,126 A | 9/1987 | Grothaus et al. | 43/112 |
| 4,700,506 A | 10/1987 | Williams | 43/113 |
| 4,709,503 A * | 12/1987 | McQueen | 43/114 |
| 4,813,174 A | 3/1989 | Cook | 43/107 |
| 4,820,513 A | 4/1989 | Howse | 424/84 |
| 4,829,702 A | 5/1989 | Silvandersson | 43/114 |
| 4,849,216 A | 7/1989 | Andersen | 424/84 |
| 4,873,786 A * | 10/1989 | Franco | 43/113 |
| 4,876,822 A | 10/1989 | White | 43/113 |
| 4,884,064 A * | 11/1989 | Meehan | 43/69 |
| 4,914,854 A | 4/1990 | Zhou et al. | 43/112 |
| 4,918,856 A | 4/1990 | Olive et al. | 43/113 |
| 4,945,107 A | 7/1990 | Minetti | 514/473 |
| 4,949,501 A * | 8/1990 | Larkin | 43/113 |
| 4,951,414 A * | 8/1990 | Mewissen | 43/112 |
| 4,959,923 A | 10/1990 | Aiello et al. | 43/112 |
| 4,979,329 A | 12/1990 | Olive et al. | 43/113 |
| 4,999,754 A | 3/1991 | Gary | 302/237 |
| 5,044,112 A | 9/1991 | Williams | 43/113 |
| D325,954 S | 5/1992 | Lazzeroni, Sr. et al. | D22/123 |
| 5,142,815 A | 9/1992 | Birdsong | 43/113 |
| 5,184,417 A * | 2/1993 | Weldon | 43/113 |
| D335,912 S | 5/1993 | Brown et al. | D22/122 |
| 5,241,778 A | 9/1993 | Price | 43/132.1 |
| 5,255,468 A | 10/1993 | Cheshire, Jr. | 43/113 |
| 5,259,153 A | 11/1993 | Olive et al. | 43/113 |
| 5,301,456 A * | 4/1994 | Jobin et al. | 43/113 |
| 5,311,696 A * | 5/1994 | Gauthier et al. | 43/113 |
| 5,311,697 A | 5/1994 | Cavanaugh et al. | 43/132.1 |
| 5,325,625 A * | 7/1994 | Liu et al. | 43/114 |
| 5,353,542 A * | 10/1994 | Vaudry | 43/113 |
| 5,365,690 A | 11/1994 | Nelson et al. | 43/113 |
| 5,396,729 A * | 3/1995 | Vejvoda | 43/114 |
| 5,425,197 A | 6/1995 | Smith | 43/113 |
| 5,505,017 A | 4/1996 | Nelson et al. | 43/113 |
| 5,513,465 A | 5/1996 | Demarest et al. | 43/113 |
| 5,628,142 A * | 5/1997 | Kitterman et al. | 43/114 |
| 5,722,199 A * | 3/1998 | Demarest et al. | 43/113 |
| 5,750,129 A | 5/1998 | Wakarchuk | 424/408 |
| 5,915,948 A | 6/1999 | Kunze et al. | 43/114 |
| 5,950,355 A | 9/1999 | Gilbert | 43/113 |
| 5,974,727 A | 11/1999 | Gilbert | 43/113 |
| 6,108,965 A | 8/2000 | Burrows et al. | 43/113 |
| 6,108,966 A | 8/2000 | Otomo et al. | 43/113 |
| 6,202,339 B1 * | 3/2001 | Knuppel | 43/114 |
| 6,289,629 B2 | 9/2001 | Greening | 43/113 |
| 6,344,208 B1 | 2/2002 | Howse | 424/405 |
| 6,397,515 B1 | 6/2002 | Brown et al. | 43/113 |
| 6,467,215 B1 | 10/2002 | Nelson et al. | 43/107 |
| 6,493,986 B1 | 12/2002 | Nelson et al. | 43/113 |
| 6,505,434 B1 | 1/2003 | Kloczko et al. | |
| 6,516,558 B1 | 2/2003 | Lingren et al. | 43/107 |
| 6,546,667 B1 | 4/2003 | Carter | 43/107 |
| 6,560,918 B2 * | 5/2003 | Nelson | 43/113 |
| 6,560,919 B2 | 5/2003 | Burrows et al. | 43/113 |
| 6,568,123 B2 | 5/2003 | Nelson et al. | 43/107 |
| 6,568,124 B1 * | 5/2003 | Wilbanks | 43/113 |
| 6,568,125 B2 * | 5/2003 | Kleinhenz | 43/139 |
| 6,574,914 B2 * | 6/2003 | Smith | 43/113 |
| 2001/0010367 A1 | 8/2001 | Burnell-Jones | 252/301.36 |
| 2001/0042337 A1 | 11/2001 | Lambert et al. | 43/113 |
| 2001/0045052 A1 | 11/2001 | Coventry | 43/132.1 |
| 2002/0020105 A1 | 2/2002 | Sharpe | 43/111 |
| 2002/0032980 A1 | 3/2002 | Nelson | 43/113 |
| 2002/0078620 A1 | 6/2002 | Nelson et al. | 43/113 |
| 2002/0139040 A1 | 10/2002 | Burrows et al. | 43/113 |
| 2003/0041506 A1 | 3/2003 | Coventry | 43/132.1 |
| 2003/0079398 A1 | 5/2003 | Holmes | 43/113 |
| 2003/0089023 A1 | 5/2003 | Nelson et al. | 43/113 |
| 2003/0089024 A1 | 5/2003 | Nelson et al. | 43/113 |
| 2003/0213161 A1 * | 11/2003 | Gardner et al. | 43/114 |

* cited by examiner

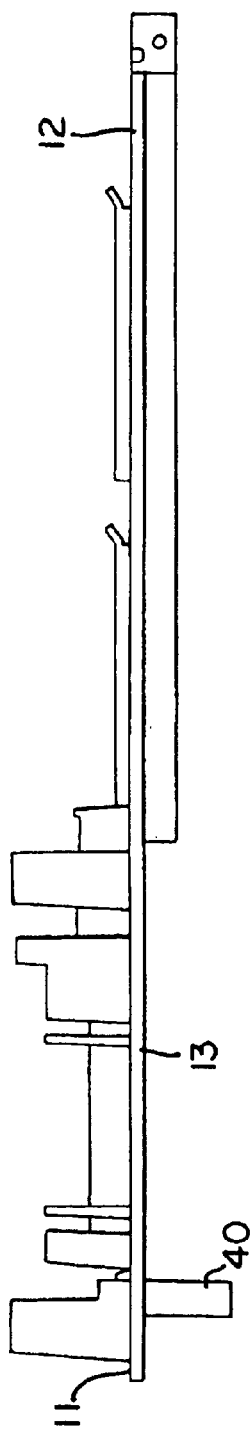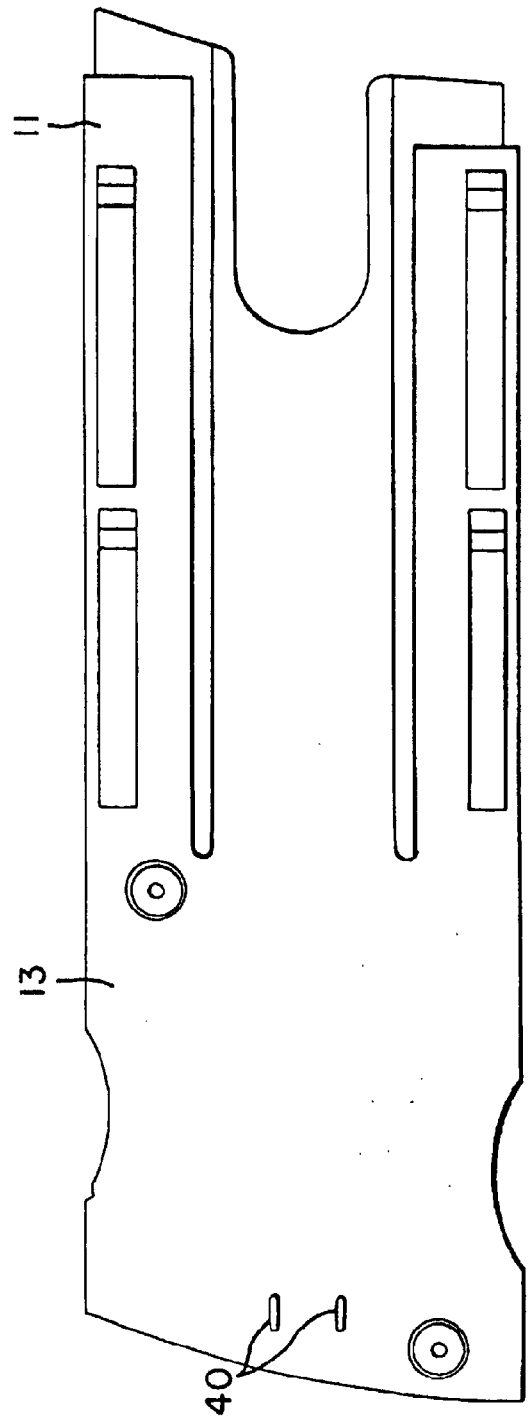

INSECT TRAP

FIELD OF THE INVENTION

The present invention relates generally to the field of insect traps, and particularly to insect traps which include an insect-attracting light source.

BACKGROUND OF THE INVENTION

Insect traps that include a sticky substance capable of ensnaring insects are well known. Such insect traps, for example fly paper, may include a sticky substance applied as a coating on paper or other sheet material. One disadvantage associated with insect traps of this type is that the adhesive characteristics of the sticky substance usually diminish over time. Also, such insect traps usually become unsightly due to the concentration of dead insects on the sticky substance. Thus, insect traps of this type require periodic maintenance, by replacing the insect trap entirely or by replacing the portion of the insect trap that bears the sticky substance.

Insect traps that include an insect attractant, for example a light, are also known. Examples of such traps are disclosed in U.S. Pat. No. 4,876,822 issued to White, U.S. Pat. Nos. 5,365,690 and 5,505,017 issued to Nelson, and U.S. Pat. No. 4,949,501 issued to Larkin. Such insect traps have included a sticky substance capable of ensnaring insects after they have been attracted. Other such insect traps have included other insect neutralizers, for example exposed electrical wires able to deliver a lethal electrical shock to insects. Insect traps of this type often require electrical power for operation of an insect attractant or an insect neutralizer, or both.

Some geographical areas, particularly areas which experience temperatures below freezing during portions of the year, experience insect populations which are seasonal. In such geographical areas, insect traps may not be needed for large portions of the year. Similarly, cabins, outdoor porches, gazebos, shelters in public parks, portions of restaurants or other facilities used for wedding receptions and the like, or other entertaining or living spaces may be used on a seasonal, intermittent, or temporary basis. In such settings, insect traps may be required only when those spaces are in use.

Some insect traps, especially insect traps which require electrical power, are permanently installed. For example, insect traps may be mounted on a pole when installed in an outdoor area, or affixed to a wall with screws or other mounting hardware when installed in an indoor area. Insect traps which require permanent or semi-permanent installation are not as well suited for seasonal or intermittent use as an insect trap which can be easily installed when needed and easily removed when not needed. Further, insect traps which require permanent or semi-permanent installation may require alteration of walls onto which they are mounted, making such insect traps unsuitable for temporary use, for example when used in a public shelter house or in a space which is rented for a short period of time.

Other insect traps, for example flypaper, may be suitable for temporary, seasonal, or intermittent use. However, the unsightly appearance of dead insects in such traps diminishes the usefulness of such traps, especially in spaces used for dining or entertaining, for example in restaurants, reception halls, and the like. Further, such traps may be less effective than traps which use electrical power.

SUMMARY OF THE INVENTION

The present invention relates to an insect trap which includes a base having a rear surface and a front surface, a housing mounted to cover at least a portion of the front surface of the base, a light source between the housing and the front surface of the base, an adhesive surface between the housing and the front surface of the base, and an electrical plug protruding from the rear surface of the base whereby the insect trap may be mounted by inserting the electrical plug into an electrical socket.

An insect trap according to the invention can be easily mounted and removed, making it suitable for intermittent, seasonal, or temporary use. An insect trap according to the invention may have an improved appearance compared to other insect traps which are suitable for intermittent, seasonal, or temporary use. An insect trap according to the invention may also be more effective compared to other insect traps which are suitable for intermittent, seasonal, or temporary use.

According to another aspect of the invention, an insect trap includes an enclosure having a rear surface and at least one opening, an insect attractant located at least partially within the enclosure, an insect neutralizer located at least partially within the enclosure, and an electrical plug protruding from the rear surface of the enclosure. In a preferred embodiment of the invention, the insect attractant is a light, the insect neutralizer is sheet material bearing a sticky substance able to ensnare insects, and the enclosure is adapted to allow easy replacement of the sheet material.

According to another aspect of the invention, an insect trap includes an enclosure having a rear surface and at least one opening, an insect lure able to attract insects coupled to the enclosure, for example a pheromone, scent, bait, or the like, an insect neutralizer located at least partially within the enclosure, and an electrical plug that protrudes from the rear surface of the enclosure.

An insect trap according to the invention may include additional features to enhance the effectiveness, extend the useful life, or improve the appearance of the insect trap, although this is not required. For example, an insect trap according to the invention may include a timer, light detector, thermocouple, or motion detector for providing stimulus to a controller adapted to selectively operate the insect attractant (for example the light) or insect neutralizer. An insect trap according to the invention may include a status indicator adapted to indicate that the insect trap requires maintenance.

Further objects, features, and advantages of the invention will be apparent from the following detailed description when taken in conjunction with the following drawings.

BRIEF DESCRIPTION OF THE DRAWINGS

In the drawings:

FIG. 4 is a side view of the base of a preferred embodiment of an insect trap according to the invention.

FIG. 5 is a rear view of the base of a preferred embodiment of an insect trap according to the invention with the power plug in a horizontal position.

DETAILED DESCRIPTION OF THE INVENTION

Figure 1:
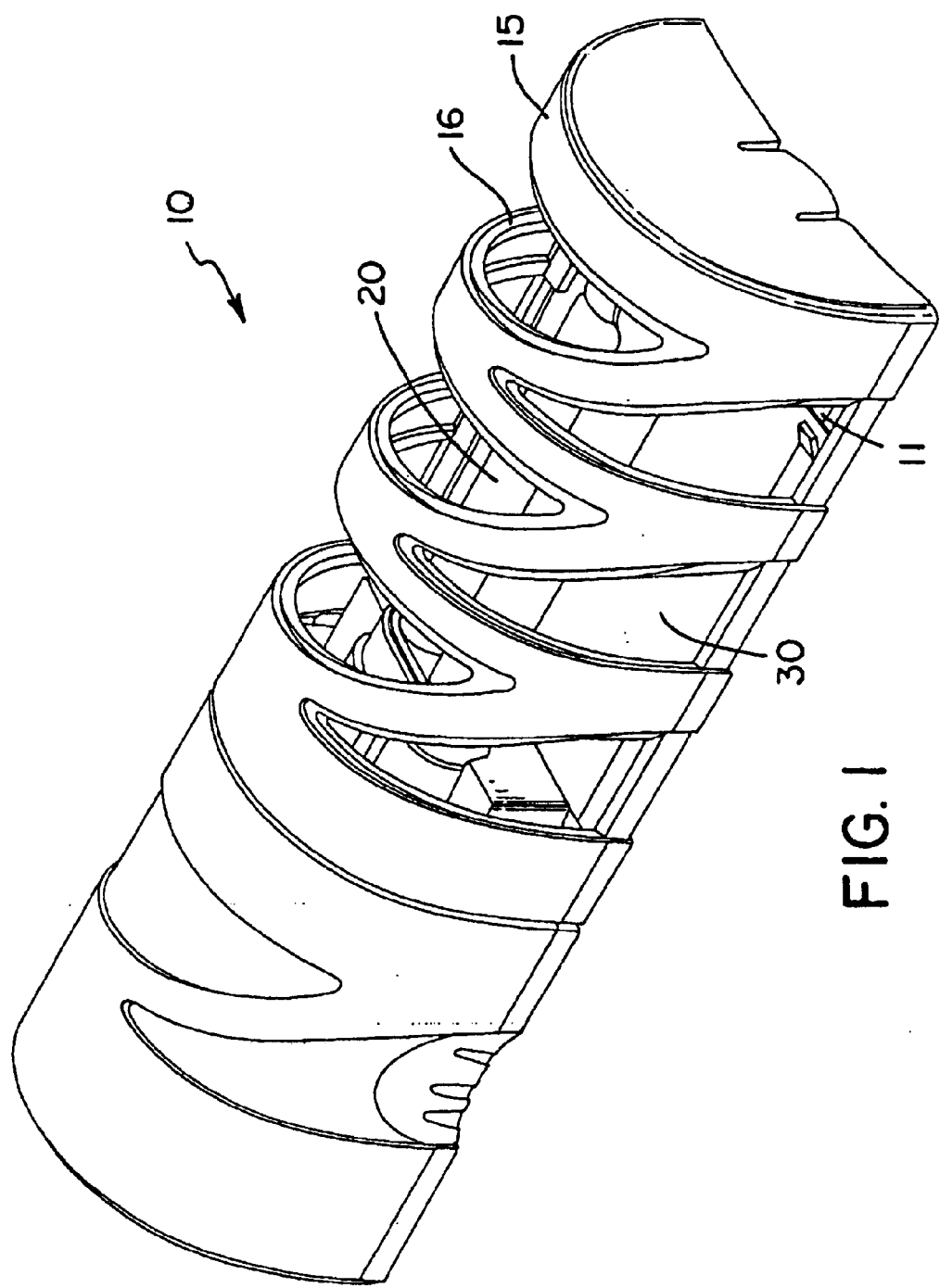
FIG. 1 is a perspective view of a preferred embodiment of an insect trap according to the invention.

With reference to the drawings, FIG. 1 shows a perspective view of a preferred embodiment of an insect trap according to the invention, indicated generally at 10. The insect trap 10 includes a base 11 and a housing 15 having at least one opening 16. The base 11 and housing 15 together form an enclosure having at least one opening 16, although this is not required and a suitable enclosure having at least one opening may be formed in other ways.

The insect trap 10 includes an insect attractant which is preferably a light 20, although this is not required and other insect attractants may be used. The insect trap 10 also includes an insect neutralizer which is preferably an adhesive surface 30, although this is not required and other insect neutralizers may be used. In the insect trap 10, the opening 16 allows light to pass out of the enclosure in order to attract insects. In the insect trap 10, the opening 16 also allows insects to enter the enclosure where they may be ensnared by the adhesive surface 30.

Figure 2:
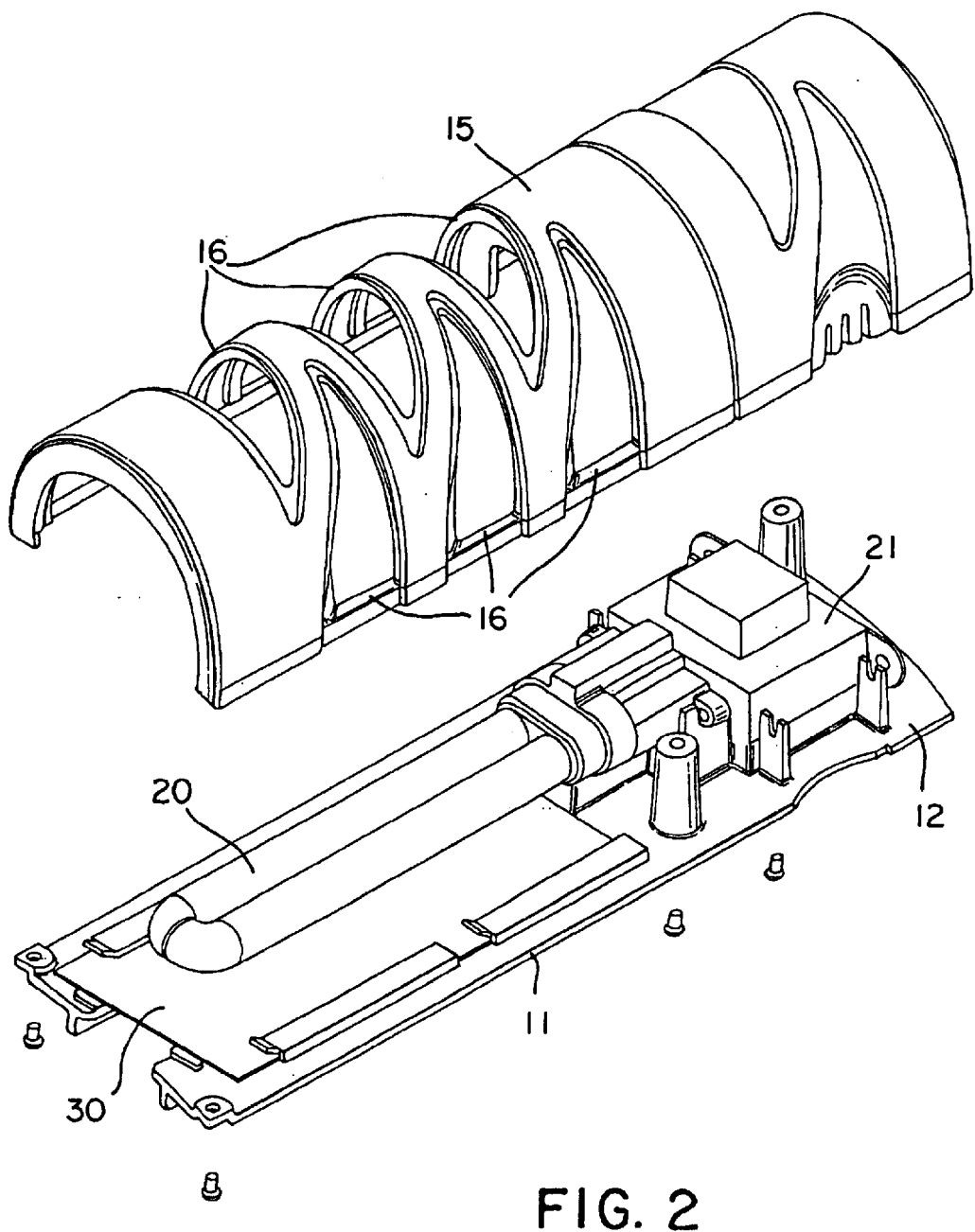
FIG. 2 is a side perspective view of a preferred embodiment of an insect trap according to the invention with the housing separated from the base assembly.

FIG. 2 shows a side perspective view of the insect trap 10 with the housing 15 separated from the base 11. As best shown in FIG. 2, the housing 15 preferably has a plurality of openings to facilitate light passing out of the enclosure, and to facilitate insects entering the enclosure. The shape of the housing 15 and the openings 16 are preferably designed to enhance the appearance of the insect trap 10, although this is not necessary. The base 11 has a front surface 12.

The insect attractant, which is preferably a light 20, functions to increase the likelihood that insects will approach the insect trap 10 or enter the enclosure of the insect trap 10. The light 20 may be mounted to the front surface 12 of the base 11, although the light 20 may be mounted elsewhere, for example on the housing 15. The light 20 may be of the flourescent type as shown in FIG. 2, in which case the insect trap 10 may include a ballast 21, although other types of light may be used in accordance with the invention.

The insect neutralizer, which is preferably an adhesive surface 30, functions to immobilize, kill, or otherwise adversely affect insects which approach the insect trap 10 or enter the enclosure of the insect trap 10. The adhesive surface 30 may be mounted to the front surface 12 of the base 11, although the adhesive surface 30 may be mounted elsewhere, for example on the housing 15. The adhesive surface 30 may be formed of sheet material bearing an adhesive substance placed in vertical slots formed in the front surface 12 of the base 11, although other types of adhesive surfaces and mounting orientations may be used. For example, the adhesive surface 30 may be a liquid contained in a reservoir. The base 11 and housing 15 are preferably formed to allow easy removal and replacement of the adhesive surface 30.

Figure 3:
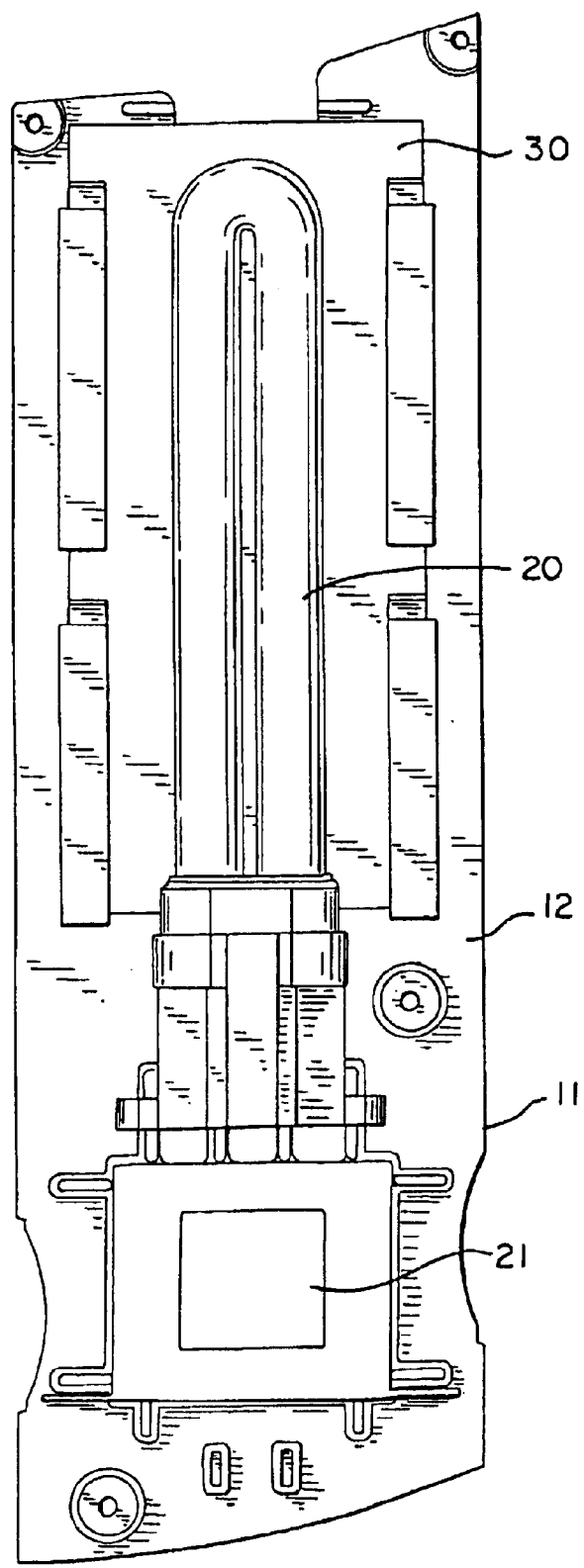
FIG. 3 is a front view of the base assembly of a preferred embodiment of an insect trap according to the invention.

FIG. 3 is a front view of the base assembly of the insect trap 10. The insect trap 10 includes a base 11 having a front surface 12. The insect trap 10 includes an insect attractant, which is preferably a light 20. The light 20 is preferably of the flourescent type and may require a ballast 21, although other types of lights may be used. The insect trap 10 also includes an insect neutralizer, which is preferably an adhesive surface 30.

FIG. 4 is a side view of the base 11 of the insect trap 10. As best shown in FIG. 4, the base 11 of the insect trap 10 has a front surface 12 and a rear surface 13. The insect trap 10 includes an electrical plug 40 that protrudes from the rear surface 13 of the base 11.

FIG. 5 is a rear view of the base 11 of the insect trap 10. As best shown in FIGS. 4 and 5, the electrical plug 40 is preferably a standard two conductor plug of the type commonly used in the United States for 120VAC household electricity, although this is not required and other types may be used. For example, a standard three conductor plug including a safety ground conductor of the type commonly used in the United States may be used. Other electrical plugs, for example electrical plugs used in foreign countries or electrical plugs used to carry 12VDC power and the like, may also be used in accordance with the invention.

Figure 6:
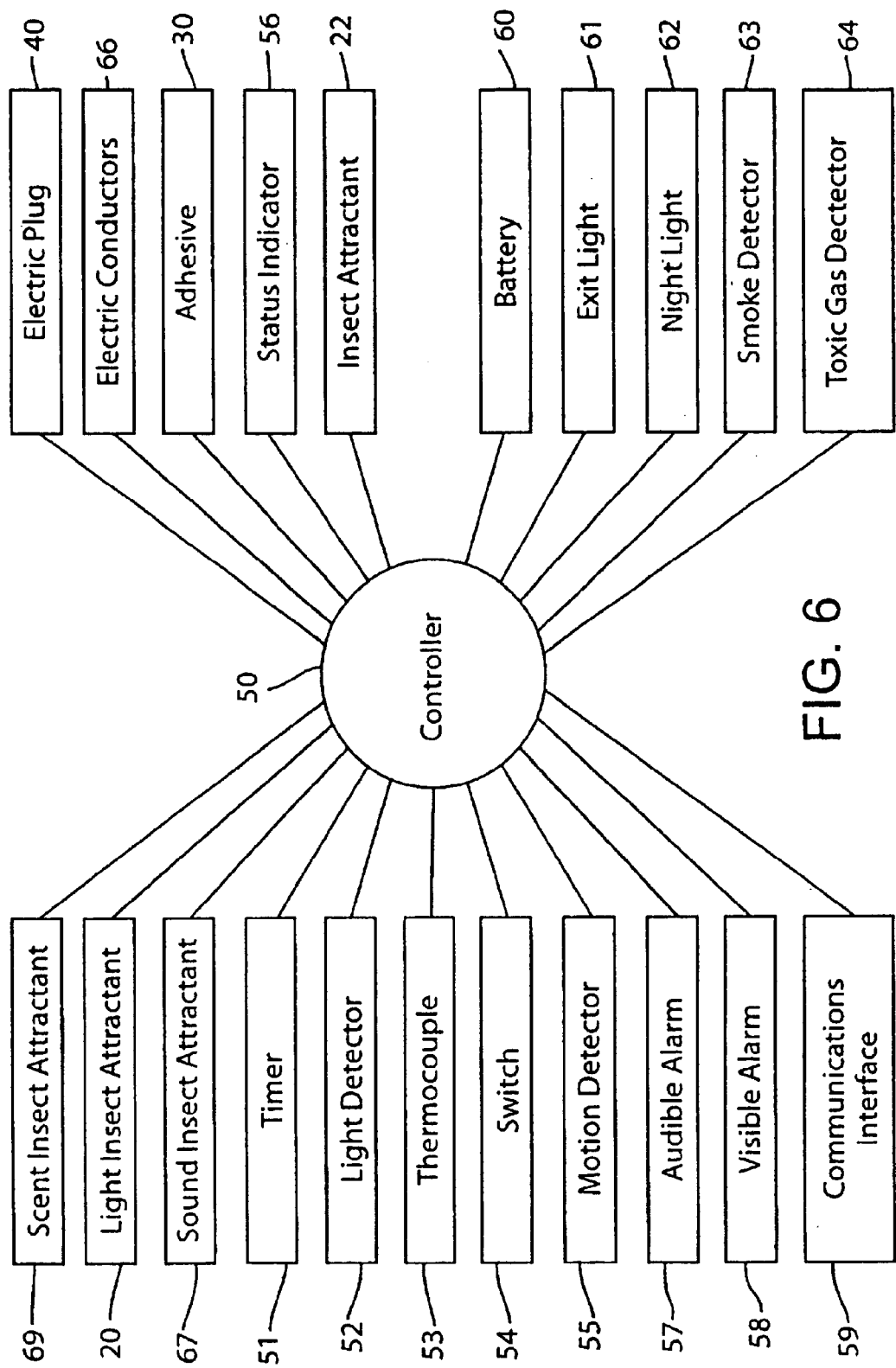
FIG. 6 is a block diagram of the internal components of an insect trap according to the invention.
Figure 7:
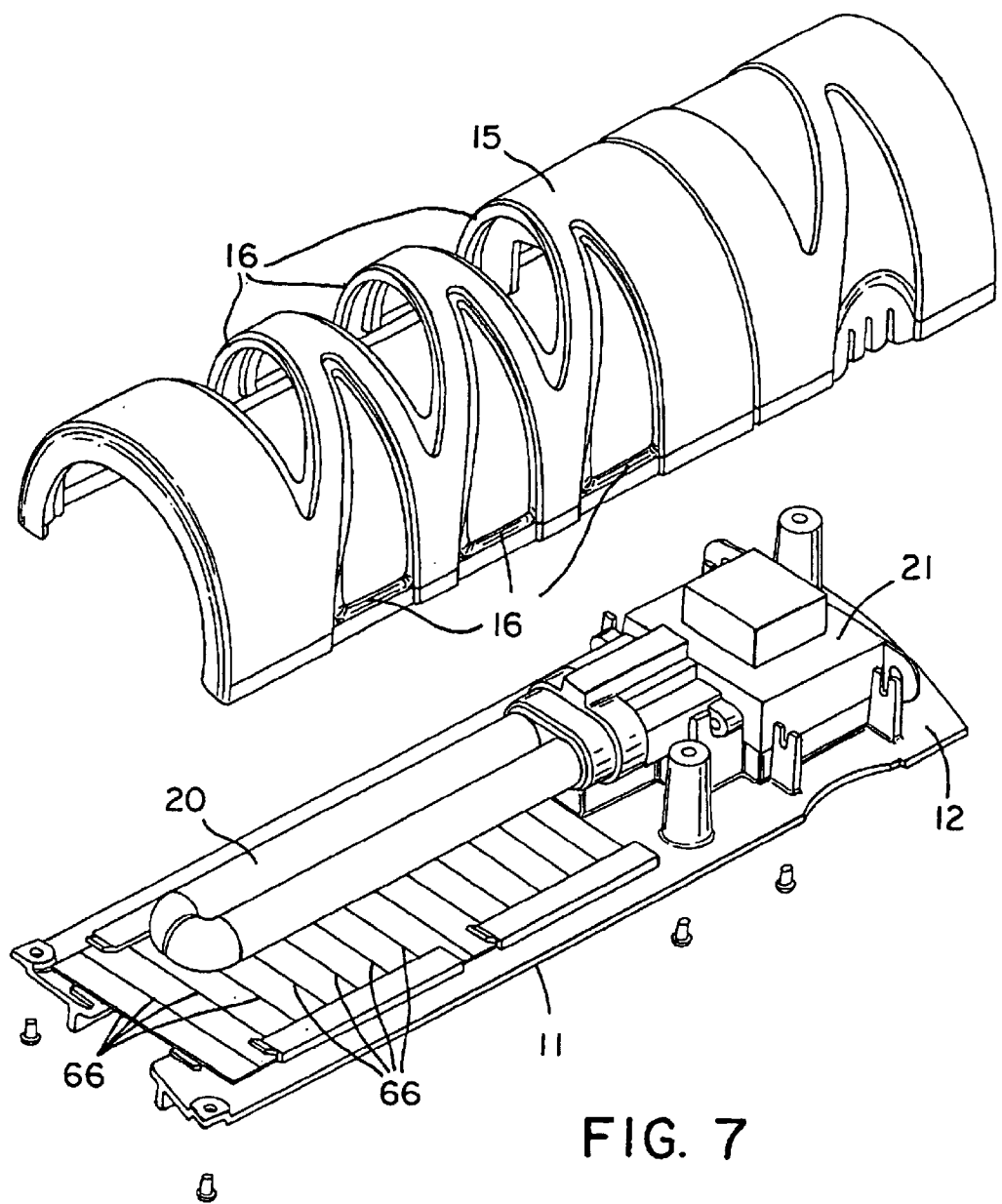
FIG. 7 is a side perspective view of an alternative embodiment of an insect trap according to the invention with the housing separated from the base assembly.

FIG. 6 is a block diagram of the internal components of an insect trap according to the invention. An insect trap according to the invention may include a timer 51 and a controller 50, which may be adapted to control a status indicator 56 to show, for example, that maintenance is required. The timer 51 and controller 50 may also be used, for example, to operate the insect attractant 22 or the insect neutralizer during certain times of day.

An insect trap according to the invention may include a light detector 52 and a controller 50, which may be adapted to control the insect attractant 22 or the insect neutralizer, for example to operate the insect attractant 22 or the insect neutralizer only during nighttime hours.

An insect trap according to the invention may include a thermocouple 53 and a controller 50, which may be adapted to control the insect attractant 22 or the insect neutralizer, for example to operate the insect attractant 22 or the insect neutralizer only during periods when the temperature exceeds freezing.

An insect trap according to the invention may include a switch 54 and a controller 50, which may be adapted to control the insect attractant 22 or the insect neutralizer, for example to operate the insect attractant 22 or the insect neutralizer only when the switch is turned on.

An insect trap according to the invention may include a motion detector 55 and a controller 50, which may be adapted to control the insect attractant 22 or the insect neutralizer, for example to operate the insect attractant 22 or the insect neutralizer only when the motion detector indicates that the presence of movement in the vicinity of the insect trap, for example of persons, animals, or insects.

An insect trap according to the invention may include a status indicator 56 and a controller 50 which may be adapted to control the status indicator 56, for example to indicate that the insect trap requires maintenance.

An insect trap according to the invention may include an audible alarm 57 or a visible alarm 58 or both types of alarm, and a controller 50 which may be adapted to control the audible alarm 57 or visible alarm 58, for example to indicate that the insect trap requires maintenance or to indicate the presence of smoke, toxic gas, or other hazards in the environment.

An insect trap according to the invention may include a communications interface 59, for example a radio transmitter and/or a radio receiver, and a controller 50 which may be adapted to control the communications interface 59, for example to receive control signals or to transmit status signals. Such a communications interface 59 may be used, for example, to receive control signals to turn on the insect trap or to send status signals regarding the state of the insect trap or its environment.

An insect trap according to the invention may include a battery 60, for example to provide power to any of the electrical components of the insect trap.

An insect trap according to the invention may include an exit light 61 or night light 62, and a controller 50 which may be adapted to control the exit light 61 or night light 62, for example to turn on the exit light 61 or night light 62 in the event of a power outage or when darkness falls.

An insect trap according to the invention may include an smoke detector 63 or toxic gas detector 64 (for example a carbon monoxide detector), and a controller 50 which may be adapted to receive a signal from the smoke detector 63 or the toxic gas detector 64 which may be used, for example, to activate the audible alarm 60 or visible alarm 58, or to transmit status information using the communications interface 59, in the event that smoke or toxic gas is detected in the vicinity of the insect trap.

There are various possibilities with regard to alternative embodiments and applications of an insect trap according to the invention.

Although the insect trap 10 preferably uses a single light 20 as an insect attractant, this is not required and a plurality of lights may be used.

Other insect attractants may also be used. For example, pheromones, scent, baits, or the like, which will be referred to as "scent," may be used as an insect attractant in accordance with the invention. A scent 69 used as an insect attractant 22 may be a combination of other scents. Scent 69 may be dispersed, for example by using a fan or by placing an electrical warming element in close proximity to a medium, gel, or other substance or apparatus able to produce scents. Sound 67 may also be used as an insect attractant 22. A combination of insect attractants may also be used in accordance with the invention. For example, light 20 may be used in combination with another attractant such as scents 69 or sound 67.

Although the insect trap 10 preferably uses an adhesive surface 30 formed of a sheet material bearing an adhesive 30 as an insect neutralizer, this is not required and other insect neutralizers may be used. For example, electrical conductors 66 capable of delivering a lethal shock to insects may be used as an insect neutralizer in accordance with the invention.

Although the electrical plug 40 is preferably fixed to the rear surface 13 of the base 10 as shown in FIG. 4, this is not required. For example, the electrical plug 40 may be adapted to rotate so that the insect trap 10 may be mounted in either a vertical or a horizontal orientation.

Although the enclosure or housing of an insect trap according to the invention is preferably adapted to be aesthetically pleasing, this is not required. For example, the enclosure or housing may bear advertising messages, or the enclosure or housing may be designed without regard to its appearance. The enclosure or housing may serve other functional purposes, for example the enclosure or housing may bear the face of a working clock, message board, thermometer, or the like in accordance with the invention.

It is understood that the invention is not confined to the embodiments set forth herein as illustrative, but embraces all such forms thereof as come within the scope of the following claims.

What is claimed is:

1. An insect trap comprising:
   (a) an enclosure having a substantially planar rear surface and at least one opening;
   (b) an insect attractant located at least partially within the enclosure;
   (c) an insect neutralizer located at least partially within the enclosure; and
   (d) an electrical plug having rigid conductors protruding substantially perpendicularly and directly from the rear surface of the enclosure, wherein the conductors are insertable into an electrical socket,
   whereby the insect trap may be mounted by inserting the electrical plug into an electrical socket and wherein the insect neutralizer includes an adhesive substance.

2. The insect trap of claim 1 wherein the electrical plug is electrically connected to the insect attractant whereby electrical power may be supplied to the insect attractant.

3. The insect trap of claim 1 wherein the insect attractant emits light.

4. The insect trap of claim 1 wherein the insect attractant emits scent.

5. The insect trap of claim 1 wherein the insect attractant emits sound.

6. An insect trap comprising:
   (a) an enclosure having a substantially planar rear surface and at least one opening;
   (b) an insect attractant located at least partially within the enclosure;
   (c) an insect neutralizer located at least partially within the enclosure; and
   (d) an electrical plug having rigid conductors protruding substantially perpendicularly and directly from the rear surface of the enclosure, wherein the conductors are insertable into an electrical socket,
   whereby the insect trap may be mounted by inserting the electrical plug into an electrical socket and wherein the insect neutralizer delivers an electric shock to insects within the enclosure.

7. The insect trap of claim 6 wherein the electrical plug is electrically connected to the insect neutralizer, whereby electrical power may be supplied to the insect neutralizer.

8. The insect trap of claim 6 wherein the electrical plug is electrically connected to the insect attractant whereby electrical power may be supplied to the insect attractant.

9. The insect trap of claim 6 wherein the insect attractant emits light.

10. The insect trap of claim 6 wherein the insect attractant emits scent.

11. The insect trap of claim 6 wherein the insect attractant emits sound.

12. An insect trap comprising:
    (a) a base having a substantially planar rear surface and a front surface;
    (b) a housing mounted to cover at least a portion of the front surface of the base;
    (c) a light mounted between the housing and the front surface of the base;
    (d) an adhesive surface mounted between the housing and the front surface of the base; and
    (e) an electrical plug having rigid conductors protruding substantially perpendicularly and directly from the rear surface of the base, wherein the conductors are insertable into an electrical socket,
    whereby the insect trap may be mounted to an electrical socket by inserting the electrical plug into the electrical socket.

13. The insect trap of claim 12 wherein the adhesive surface is formed of sheet material bearing an adhesive material.

14. The insect trap of claim 12 wherein the light includes at least one fluorescent bulb.

15. The insect trap of claim 12 wherein the electrical plug is electrically connected to the light whereby electrical power is supplied to the light when the electrical plug is inserted into the electrical socket.

* * * * *